2,949,365

BREAD DUSTING MIXTURE AND METHOD

Arthur C. Becker, 8724 S. Dalton Ave.,
Los Angeles, Calif.

No Drawing. Filed Apr. 28, 1958, Ser. No. 731,087

5 Claims. (Cl. 99—118)

This invention relates to an improvement in the art of baking bread, cakes, and the like, and in particular to a material and method of making and applying the material to dough, baking pans, or both, to prevent sticking of the baked loaf, cakes, etc. in the pan, to improve the quality of the product, and to reduce production costs.

Various means are used in the bread baking industry, for example, to facilitate release of the loaf from the pan. Such means in the past have been only partially successful. Near perfect success is desired in modern, automated bakeries where the releasing operation is performed mechanically. Furthermore, expedients used in the past to facilitate release have proved disadvantageous from several aspects.

For example, some commercial bakeries commonly have been using a vegetable oil to assist in releasing the loaf from the pan. The vegetable oil is applied onto the sides of the baking pan by the use of a complicated pan greasing machine. A piece of batter or dough having a volume equal to about one-fifth that of the pan is deposited in the pan. The pan containing the dough, along with a number of other pans similarly supplied with dough, is put on a pan rack and mechanically or manually placed in a proof box or steam box. The dough is kept in the proof box for about an hour at about 100° F. and in an atmosphere having a relative humidity of about 90% to prevent crusting of the dough. Fermentation of the dough is accelerated in the proof box and the piece in each pan rises to about three times its original height. At these time, temperature, and relative humidity conditions, oil globules on the sides of each pan tend to coalesce to form large globules which run or flow to the bottom of the pan. This results in depleting the inside surfaces of the sides of the pan of oil to the point where the streaks of oil remaining thereon are not sufficient to cover the inside surfaces in the manner intended. Furthermore, an excessive amount of oil collects in pools around the bottom of the pan. When the pan containing the piece of dough is removed from the proof box and placed in the oven it normally is baked at a temperature of about 440° to 500° F. for about a half hour. As the dough expands in the pan it exerts pressure on the oil-diminished inside surfaces of the sides of the pan and on the inside surface of the bottom of the pan which contains pools of oil around its borders but little in its central area. This commonly results in adhesion or sticking of the baked loaf to the sides and central area of the bottom of the pan and makes it difficult to release the loaf either manually or mechanically, and a substantial number of loaves are so damaged as to render them unsaleable due to such sticking.

Oils normally used in commercial bakeries for greasing the dough pans frequently contain mucilaginous matter which upon being heated in air becomes oxidized to a varnish-like carbonization on the inside surfaces of the pan and a gum around the borders of the bottom of the pan. This, together with portions of adhered bread crust and crumbs, makes it necessary to clean and regrease the pans at frequent intervals. Such accumulations on the pan surfaces furthermore create undesirable rancid odors in the bakery.

It is also common practice in the baking industry to apply a protective coating of a silicone material to the interior of the pans, which must be removed and a similar new coating applied at frequent intervals, which is expensive and troublesome.

It is a primary object of this invention to provide a dusting powder which may be applied to the surface of the uncooked dough or to the interior of the baking pans in bakeries, or both, as a substitute for and in lieu of the greasing and silicone coatings, or either, heretofore employed, to prevent sticking of the baked products to their pans and to improve the quality of the product.

I have found that in such a dusting powder it is important to employ a mixture consisting of a fully or substantially saturated or hydrogenated edible fat and a flour, such as a wheat flour, with the fat in the form of small solid or semi-solid discrete particles dispersed substantially uniformly throughout the flour, and this is another object of my invention. I prefer to use such a fat having an iodine value number in the range of 0 to 30, and this also is another object of the invention.

I have also discovered that there is an optimum size relationship between the sizes of the fat particles and the flour particles in such dusting powder, the flour particles being in the range of 0.0029 to 0.0070 inch, and this also is an object of the invention.

Still another object of the invention is to provide such a dusting powder in which a small quantity of an emulsifier such as lecithin is added and in which diacetyl may be added to enhance the flavor of the bakery product to which the powder is applied.

Also important in such a dusting powder is the ratio of fat to flour, by weight therein, optimum ratios being between 20% to 50% of fat to between 80% to 50% of flour, and this is a further object of the invention.

In the preparation of such a dusting powder, it is desirable, if not essential, to reduce the fat to the desired particle size, by spraying or otherwise, before it contacts the flour particles in an ambient temperature below the melting point of the fat, to insure that the fat particles are solid or semi-solid when they contact the flour, and this is still another object of the invention.

Still another object of the invention is to apply such a dusting powder in controlled quantities to the surface of formed pieces of baking dough prior to baking the same, and to apply such powder in controlled quantities to the interior of bakery pans, or either.

Other objects and advantages will appear from the following specification, which is for the purpose of illustration only and not by way of limitation.

The dusting material or powder of the present invention contains an edible flour and discrete particles of an edible fat dispersed substantially uniformly throughout the flour particles.

The fat employed in my dusting powder is a substantially saturated hydrogenated edible fat having an iodine value number of from 0 to 30, and may be any suitable vegetable, animal, or marine fat. Suitable fats of low cost can be prepared by hydrogenating oils such as soy bean, cottonseed, peanut, and sesame, as is well-known in the art, although these are merely examples. The fats suitable for use in my invention should be solid or semi-solid at normal ambient atmospheric temperatures.

The flour used in my dusting powder may be any edible flour compatible with the particular use of the dusting powder in a baking operation as described hereinafter. Such flour may be any of those conventionally produced from wheat, such as regular baker's flour, whole wheat, and hard wheat, or from rice, rye, buckwheat, barley, corn, oats, or other cereals. Such flour should be a free-flowing flour consisting of small discrete particles, and the size of such particles is important in the practice of the invention, it being desirable to employ a flour in which the particles range in size from about 0.0029 to about 0.0070 inch, the particles being of a silk sieve number of from 9XX to 20XX.

The fat in the dusting powder is in the form of small discrete fat particles which are solid or semi-solid and are substantially uniformily dispersed through the flour of the mixture. Such fat particles should range in size from about 0.0002 to about 0.0007 inch, the smaller sized fat particles being used with a fine flour and the larger sized fat particles being used with a coarser flour.

The proportion of fat to flour in the dusting material is important, and I have found that optimum results are obtained with the dusting powder in connection with usual bakery practices if the powder contains from about 20% to 50% of fat and from about 80% to 50% of flour by weight. Using about 20% of fat by weight, I prefer to use about 80% of flour by weight, reducing the flour content as the fat content is increased. The relationship should be such that the mixture retains its powdery consistency with the fat particles dispersed substantially uniformly throughout the flour.

Minor amounts of additives, such as lecithin and diacetyl, are also preferably included in the dusting powder in a finely divided form and distributed substantially uniformly therethrough. I prefer to employ about 0.1% of lecithin by weight and about 0.05% of diacetyl by weight. The function of the lecithin will be described hereinafter. The diacetyl serves only as a flavoring agent, having an odor resembling that of butter, and may be omitted if desired.

The preparation of my dusting powder is important to the practice of the invention. I prefer to melt the fat in a suitable melting tank to a temperature at which the fat is sufficiently liquid to permit its being sprayed through conventional spray nozzles to form discrete solid or semi-solid fat particles having the desired sizes pointed out above. The hot fat is sprayed from such nozzles into a mixing zone maintained at a temperature below the melting temperature of the fat, and preferably below 90° F. The droplets of fat issuing from the spray nozzles thus become solid or semi-solid in the mixing zone and before they contact flour particles in the zone, and this is also an important aspect of the invention as it insures that the fat particles merely adhere to the external surface of the flour particles and are not absorbed thereby to any substantial extent. The flour in the mixing zone may be either in the form of a mass agitated by suitable moving vanes or paddles or it may be blown pneumatically into or through the mixing zone. The flour is contacted by the solid or semi-solid fat particles in the mixing zone and they are mixed together so that the fat particles are dispersed substantially uniformly throughout the flour. The lecithin and diacetyl may be added to the flour before or after it is delivered to the mixing zone or may be added to the mixture of fat and flour after it is formed in the mixing zone. The dusting powder may be made in a batch blender of any conventional type or may be made in a blending dome of any suitable design.

When my dusting powder is made, it can be readily sacked or boxed for shipment or storage. Even when subjected to continued vibration over a substantial period of time, as might occur in shipment, there is little, if any, separation or settling of the fat particles and the mixture remains of substantially uniform quality and the fat particles retain their uniformity of distribution through the flour, and this is a valuable feature of the invention.

My dusting powder may be used in either, or both, of two manners. It may be lightly dusted or applied to the external surface of a dough piece conventionally used in bakeries before the dough is placed in the usual baking pan. Alternatively, it may be lightly dusted or applied to the surfaces of such baking pan normally contacted by the dough piece or batter, but before the dough piece or batter is deposited in the pan. In same cases it may be desirable to dust both the dough piece and the pan. However, I prefer to dust merely the dough piece in the baking of bread. I have found that when used in connection with dough pieces for standard size loaves of bread as little as about 1.3 grams of my dusting powder applied lightly over the surface of the dough piece is adequate to produce the desired results of the invention. The amount of dusting powder may vary somewhat with different types and sizes of dough pieces, but for all conventionally sized dough pieces for breadmaking a range of about 1.3 to about 2.5 grams of the dusting powder per dough piece is adequate, and the quantity of dusting powder should not be increased much over this upper limit for dough pieces of these sizes. In cake baking, however, the amount of my dusting powder required to be applied to the pan is somewhat higher than for a bread dough piece of the same size, and will normally be in the range of about 2 grams to about 3.5 grams of the dusting powder per cake batter.

The fact that the fat particles adhere to the flour particles in my dusting powder insures that the fat particles are substantially uniformly distributed over the surface of a dough piece to be baked or over the surface of the pan in which the baking is performed. This is very important, as it insures that there will be sufficient fat between the dough piece or batter and the pan during baking to insure a clean release of the baked product from the baking pan, while at the same time preventing an excess of fat on the pans. A corollary of these advantages is that far less fat need be employed to prevent sticking of the product to the pans than has hitherto been possible with conventional pan greasing methods, with a desirable attendant decrease in the cost of bakery operation.

The unbaked dough piece which has been dusted with my dusting powder or which has been placed in a pan dusted by said powder is, along with other similar dusted units, conventionally placed into a proof box atmosphere for about an hour. This atmosphere is usually maintained at about 100° F. and about 90% relative humidity. The dusting powder remains solid during this proof box treatment and the fat particles remain uniformly distributed over the surfaces of the dough piece and the insides of the pan. As the dough ferments and rises, it evenly distributes the minute particels of fat and grains of flour over the sides and bottom of the inside surface of the pan as the dough expands and presses against the surface. The fermented dough thus holds the particles of fat, carried by the grains of flour, in position uniformly distributed over the inside surfaces of the pan in just the right amount to result in perfect product release.

There is no excess of fat on the sides of the pan, nor is there a deficiency, as in the case of prior art methods. Also there are no pools of fat around the borders of the inside surface of the bottom of the pan. The grains of flour carry the fat particles and prevent them from coalescing and forming globules of fat large enough to flow and stream down the sides of the pans.

The dough is removed from the proof box after the proofing time has elapsed and is then conventionally placed in a bake oven. The first zone of this oven has a temperature of approximately 350° F. and is provided with a steam dome. The hot, moist atmosphere in this part of the oven moistens the flour in my dusting powder applied to the dough and pan. The thus moistened flour grains combine with the dough of the dough piece and become integral therewith. The minute fat particles melt and the molten fat then spreads and joins with adjacent fat to form a uniform film of fat over the entire boundary surface of the dough piece and the inside surfaces of the sides and bottom of the baking pan. The use of a stable fat, such as a fully saturated or hydrogenated fat, is desirable because such fats do not decompose appreciably at this initial oven temperature of 350° F. and do not oxidize or carbonize to any appreciable extent at temperatures of this order of magnitude.

As the baking process progresses, the pan and dough piece, or loaf, therein are transferred, along with other similar units, into baking zones of the oven maintained at temperatures up to about 450° to 500° F. and maintained therein for the desired baking times. In the final zone of the oven the temperature is reduced to about 400° F. before the pans containing the baked product are discharged to the station or zone where the loaf is released from the pan either manually or automatically by mechanical means. The baking pans are at temperatures of about 150° F. at this stage, but the baked loaves are at slightly higher temperatures. At this stage, when my dusting powder has been used, there is a slight oily film on the inside of the pan. The fatty material in the oily film generally is semi-solid at the temperatures usually prevailing at the pan release stage, although this phenomenon is not essential to the release operation. Thus, the surface of the finished product and inside surface of the pan have a more or less continuous, thin film or lubricant thereover to reliably facilitate the positive release of the loaf from the pan.

A similar thin film of lubricant is not present on the loaf and inside surfaces of the pan at the release zone or station when the pans originally have been sprayed or otherwise greased by the use of prior art methods commonly being used in commercial bakeries. Instead, when using the prior art methods, the outside surfaces of the loaf adjacent the sides of the baking pans are relatively dry and crusted by a film of varnish or gum, and are substantially free of an oily film. The sides and bottom of the loaf contain a substantial film of varnish or gummy material as a by-product from the mucilaginous matter in the oil originally applied to the insides of the pan. When using the material and method of my invention as described above, on the other hand, the baking pans are relatively free of gum and varnish because there is substantially no mucilaginous matter introduced into the pans and none remains in the pans during the baking operation to form gum or varnish. Furthermore, the loaves of baked product produced when using my invention have crusts of improved quality and color and the sides and bottom of the loaf have a finer texture and color. The improved crust results from the even distribution of the applied fat which provides a more effective seal over the product loaf. This seal keeps the product fresh for a longer period of time.

Lecithin in my dusting powder serves as an emulsifier and as an oil-soluble interfacial agent. When the dough piece dusted with my dusting powder is placed in the bake oven, the lecithin in the flour dissolves in the molten fat and enhances the tendency of the molten fat to spread and form a thin, uniform, continuous, oily film of lubricant over the inside surfaces of the pan and the adjacent surfaces of the loaf as well as the remaining exposed surfaces thereof. As pointed out above, this action of the film acts to seal the loaf, improves the texture and color of its crust and renders it less susceptible to staling. In addition, the added lecithin dissolves in the molten fat and acts as an antioxidant to additionally stabilize the fat at higher temperatures and prevent the formation of rancid odors.

My invention has been described above primarily as applied to the baking of bread in order to more clearly describe a preferred embodiment thereof. It will be understood, however, that the invention also is applicable to the baking of cakes and other bakery products. Variations and modifications needed in making such applications will be obvious to those skilled in the art and can be made in the above-described procedures without departing from the scope of my invention.

I claim as my invention:

1. In a dusting mixture for preventing sticking of baking dough to baking pans, the combination of: oleaginous material selected from the group consisting of substantially saturated edible fats and oils in the form of small semi-solid particles from about 0.0002 to about 0.0007 inch in diameter; and a grain flour having discrete particles from about 0.0029 to 0.0070 inch in diameter, said oleaginous particles being substantially uniformly dispersed throughout the flour.

2. In a dusting mixture for preventing sticking of baking dough to baking pans, the combination of: oleaginous material selected from the group consisting of substantially saturated edible fats and oils in the form of small semi-solid particles having a diameter of from about 0.0002 to about 0.0007 inch; and a grain flour having discrete particles being from about 0.0029 to about 0.0070 in diameter, said oleaginous particles being substantially uniformly dispersed throughout the flour, said mixture having an oleaginous material to flour ratio of between 20% to 50% of said material to between 80% to 50% of flour by weight.

3. In a method of preparing a dusting mixture of edible oleaginous particles and an edible flour, including the steps of: melting oleaginous material selected from the group consisting of substantially saturated edible fats and oils; spraying the oleaginous material into a blending zone maintained at a temperature below the melting point of said material, to form discrete particles having sizes within the range of about 0.0002 to about 0.0007 inch; and mixing flour with said particles in the blending zone to disperse the particles substantially uniformly throughout the flour, the flour being in the form of discrete particles having sizes within the range of about 0.0029 to about 0.0070 inch.

4. In a method of preparing a dusting mixture of an edible fat and an edible flour, including the steps of: melting a substantially saturated edible fat having an iodine value number of from 0 to 30; forming the fat into small discrete fat particles having sizes within the range of 0.0002 to 0.0007 inch; and mixing the fat particles with substantially larger discrete flour particles having sizes within the range of 0.0029 to 0.0070 inch, so as to distribute said fat particles substantially uniformly throughout the flour particles.

5. In a dusting mixture for preventing the sticking of baking dough to baking pans, the combination of: oleaginous material selected from the group consisting of substantially saturated edible fats and oils, in the form of semi-solid particles, said particles having an iodine value number of from 0 to 30 and being from about 0.0002 to about 0.0007 inch in diameter; and a grain flour having discrete particles from about 0.0029 to about 0.007 inch in size, said oleaginous particles being substantially uniformly dispersed throughout the flour particles, said mixture containing from about 20% to about 50% oleaginous particles and from about 80% to about 50% flour particles, by weight.

References Cited in the file of this patent

UNITED STATES PATENTS

| | | |
|---|---|---|
| 1,483,704 | Wilcox | Feb. 12, 1924 |
| 2,023,877 | Epstein et al. | Dec. 10, 1935 |
| 2,144,371 | Griffith et al. | Jan. 17, 1939 |
| 2,559,481 | Truesdall | July 1, 1951 |
| 2,632,705 | Scharf | Mar. 24, 1953 |
| 2,739,896 | Block et al. | Mar. 27, 1956 |
| 2,793,123 | Haas | May 21, 1957 |
| 2,808,334 | Battiste | Oct. 1, 1957 |
| 2,835,588 | Alexander et al. | May 20, 1958 |

FOREIGN PATENTS

| | | |
|---|---|---|
| 26,384 | Great Britain (A.D. 1908) | Dec. 6, 1909 |
| 20715/29 | Australia | June 18, 1929 |